United States Patent
Gretz

(10) Patent No.: US 8,664,542 B1
(45) Date of Patent: Mar. 4, 2014

(54) ELECTRICAL BOX AND FRAME ASSEMBLY FOR SHALLOW WALL CAVITIES FORMED BY FURRING STRIPS

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 70 days.

(21) Appl. No.: 13/605,379

(22) Filed: Sep. 6, 2012

(51) Int. Cl.
 *H05K 7/14* (2006.01)

(52) U.S. Cl.
 USPC ............ 174/480; 174/50; 439/535; 248/906

(58) Field of Classification Search
 CPC ............. H05K 7/14; H02B 1/46; H02B 1/18; H02B 1/42
 USPC ............ 174/53, 480, 50; 220/4.02; 439/535; 248/906, 316.7, 200
 See application file for complete search history.

(56) References Cited

U.S. PATENT DOCUMENTS

| | | | |
|---|---|---|---|
| 4,102,554 A * | 7/1978 | Reimer | 312/223.1 |
| 5,379,185 A * | 1/1995 | Griffin et al. | 361/709 |
| 5,965,844 A | 10/1999 | Lippa | |
| 6,147,304 A | 11/2000 | Doherty | |
| 7,038,132 B1 | 5/2006 | Lowe et al. | |
| 7,557,308 B2 | 7/2009 | Dinh | |
| 7,841,878 B2 | 11/2010 | Johnson et al. | |
| 8,445,780 B1 * | 5/2013 | Robins | 174/67 |

* cited by examiner

*Primary Examiner* — Dhirubhai R Patel

(57) ABSTRACT

An electrical box and frame assembly for mounting an electrical component such as a duplex receptacle in a shallow wall cavity. The electrical box assembly includes a box member, a receptacle frame adapted to receive an electrical component, and a trim plate. The box member includes rotatable flags to enable simple wall installation in old or new work situations. The box member includes sidewalls and a back wall that form a mounting cavity. The sidewalls of the box member include a narrow depth to fit within a shallow wall cavity. The receptacle frame nests substantially within the cavity of the box member and the trim plate secures over the receptacle frame and is mounted to the box member. The receptacle frame secures the duplex receptacle sideways with respect to the box member and wall cavity thereby enabling the electrical box and frame assembly to be mounted in shallow wall cavity.

17 Claims, 9 Drawing Sheets

ELECTRICAL BOX AND FRAME ASSEMBLY FOR SHALLOW WALL CAVITIES FORMED BY FURRING STRIPS

FIELD OF THE INVENTION

This invention relates to the installation of electrical components and specifically to an electrical box and frame assembly for mounting electrical components in shallow wall cavities formed by furring strips.

BACKGROUND OF THE INVENTION

In home construction it is often desirable to maximize floor space and minimize the area taken up by walls. This is especially true in the construction of mobile homes and pre-manufactured homes. In these applications furring strips are often used to form walls the walls. As furring strips are only ¾ inch wide and the covering drywall is typically ½ to ⅝ inch thick, the resulting wall cavities are as narrow as 1.25 inches. In such a wall formed by furring strips, conventional electrical boxes are unusable as their depth far exceeds the depth of the shallow wall cavities. Thus it is difficult for a homeowner to mount an electrical device such as a wall-mountable flat panel television. Mounting such an electrical device in a wall formed by furring strips is possible but very undesirable as the electrical box will typically extend outward of the finished wall.

What is needed therefore is a device and method for easily mounting an electrical box in the shallow wall cavities of a wall formed by furring strips. The device should reside easily within the shallow wall cavity and not extend outward appreciably from the wall surface.

SUMMARY OF THE INVENTION

The invention is an electrical box and frame assembly for mounting an electrical component such as a duplex receptacle in a shallow wall cavity. The electrical box assembly includes a box member, a receptacle frame, and a trim plate. The receptacle frame is adapted to accept a duplex receptacle or similar electrical component. The box member includes rotatable flags to enable a simple wall installation in old work situations. The box member includes sidewalls and a back wall that form a mounting cavity. The sidewalls of the box member include a narrow depth to fit within a shallow wall cavity. The receptacle frame nests substantially within the cavity of the box member and the trim plate secures over the receptacle frame and is mounted to the box member. The receptacle frame secures the duplex receptacle sideways with respect to the box member and wall cavity thereby enabling the electrical box and frame assembly to be mounted in shallow wall cavity. The electrical box and frame assembly can be used with a second electrical box and frame assembly to provide a bridge for providing an electrical outlet on a portion of a wall that is remote from an existing outlet. The second electrical box and frame assembly would include a cord grip for securing a flexible cord to the receptacle frame. The plug end of the flexible cord is plugged into a nearby existing electrical outlet after which line voltage is fed from the flexible cord through the second box and frame assembly to the first box and frame assembly to power the duplex receptacle mounted in the first box and frame assembly.

OBJECTS AND ADVANTAGES

Several advantages are achieved with the electrical box and frame assembly of the present invention, including:

(1) The electrical box and frame assembly enables the mounting of an electrical component in a shallow wall cavity.
(2) The electrical box and frame assembly enables the mounting of an electrical component in a wall cavity of at least 1.25 inches.
(3) The electrical box and frame assembly enables the mounting of an electrical component in a wall cavity formed by furring strips.
(4) The electrical box and frame assembly includes rotatable flags to enable rapid connection to a wall.
(5) The electrical box and frame assembly is adapted for use in old work and new work situations.
(6) The electrical box and frame assembly can be used with a second electrical box and frame assembly to provide a means of powering a TV or similar electronic device with minimal disruption to surrounding wall surfaces and eliminating the need to pull electrical cables through adjacent furring strips or studs in the wall.

These and other objects and advantages of the present invention will be better understood by reading the following description along with reference to the drawings.

DETAILED DESCRIPTION OF THE INVENTION

Figure 1:
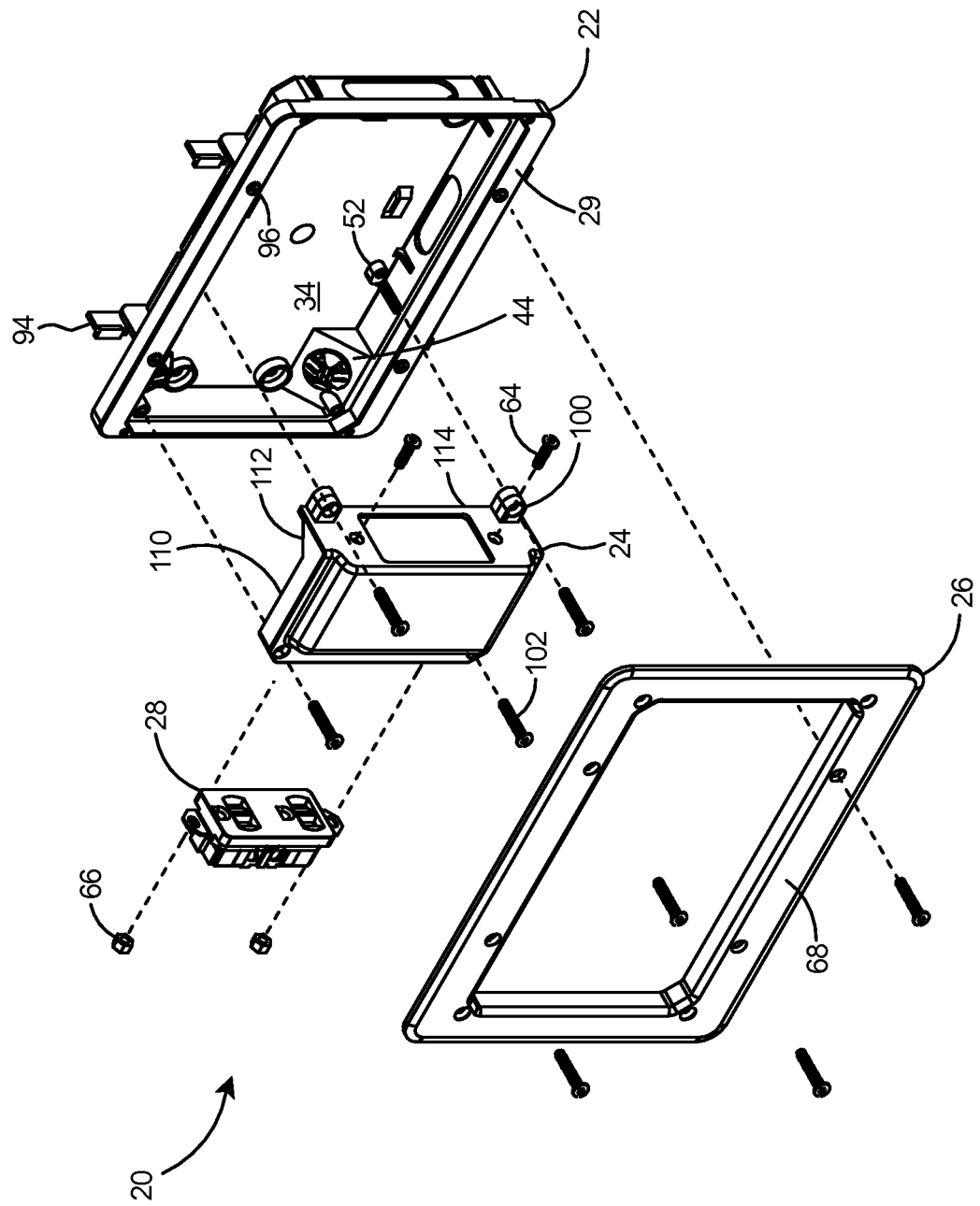
FIG. 1 is an exploded perspective view of a first and preferred embodiment of the electrical box and frame assembly of the present invention.

Referring to FIG. 1 there is shown a preferred embodiment of an electrical box and frame assembly 20 according to the present invention. The electrical box and frame assembly 20 includes a box member or box 22, a receptacle frame 24, and a trim plate 26 that work in conjunction to mount an electrical component such as the duplex receptacle 28 shown in the figure.

Figure 2:
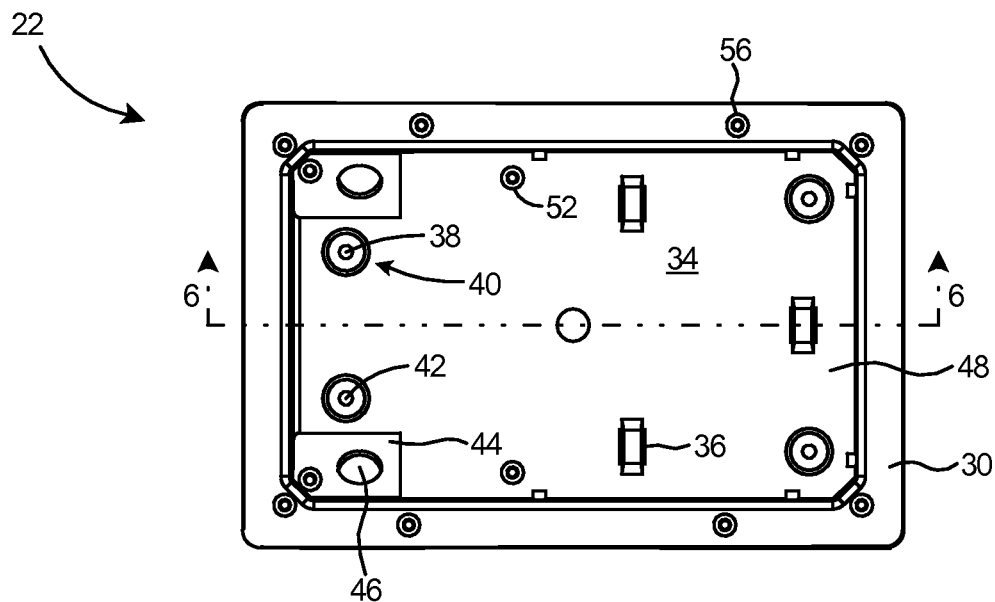
FIG. 2 is a front view of the box member portion of the electrical box and frame assembly of FIG. 1.
Figure 3:
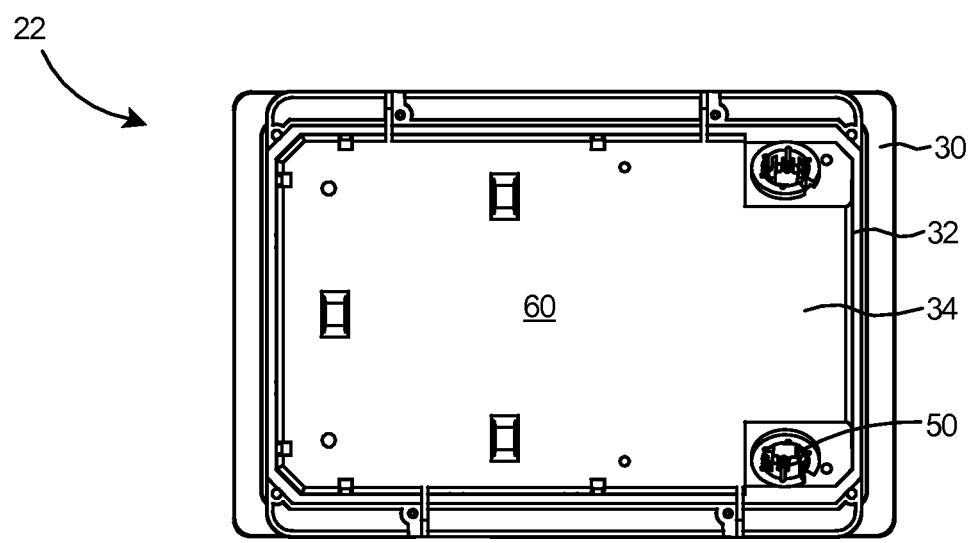
FIG. 3 is a rear view of the box member.

With reference to FIGS. 2 and 3, the box member 22 includes a front edge 29, a peripheral flange 30, sidewalls 32 integral with the peripheral flange, and a back wall 34. One or more tie-off clips 36 extend from the back wall 34 of the box member and function as tie-offs for tying off cables (not shown) which roughing in the box member during installation on a wall. A plurality of apertures 38 are provided in the back wall 34 of the box member and provide a fastening arrangement 40 for securing the box member when it is used with new construction, such as prior to framing the walls. The apertures 40 provide a location for fastening screws (not shown) there through for securing the box member 22 to the substrate. Collars 42 are provided around each aperture 40 to prevent abrasion of wires (not shown) by screw heads. A slanted mounting surface 44 including knockouts 46 therein are provided in the inner cavity 48 of the box member 22 and provide locations for insertion of cable connectors 50, such as the non-metallic NM-94 cable connector shown in FIG. 3 and available from Arlington Industries, Inc. of Scranton, Pa. Bosses 52 provided on the back wall 34 and on the slanted mounting surface 44 function to accept fasteners 54 for securing the receptacle frame 24 (see FIG. 1) to the box member. Bosses 56 are provided in peripheral flange 30 to accept fasteners 58 for securing the trim plate 26 (see FIG. 1) to the box member 22. The back wall 34 has a rear surface 60 as shown in FIG. 3.

Figure 4:
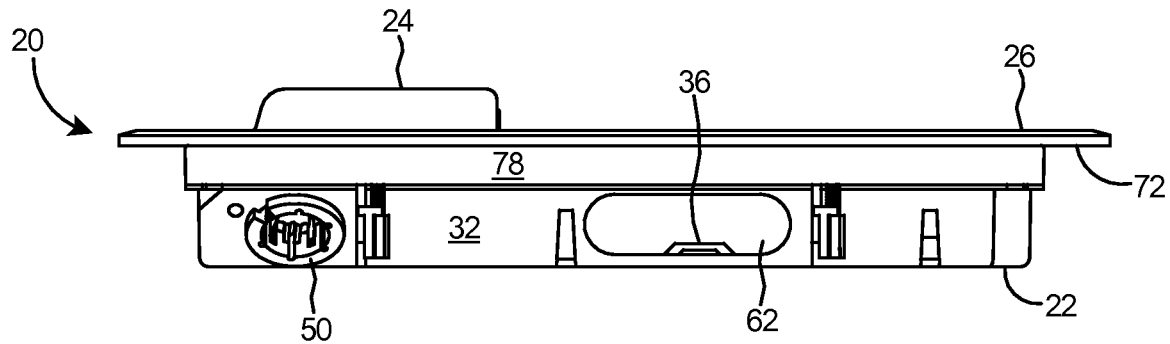
FIG. 4 is a side view of the electrical box and frame assembly.
Figure 5:
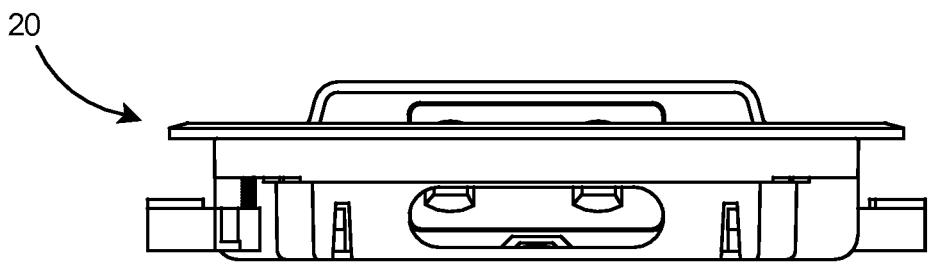
FIG. 5 is an end view of the electrical box and frame assembly.
Figure 6:
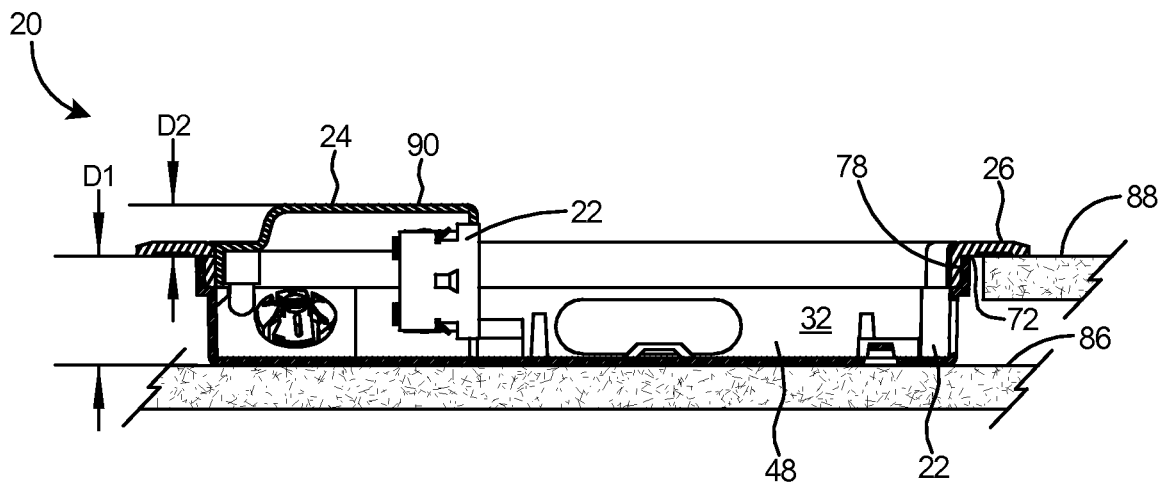
FIG. 6 is a sectional view of the electrical box and frame assembly secured to a wall.

Referring to FIGS. 4-6, box member 22 includes one or more cable openings 62 to provide a passageway for feeding low voltage cables (not shown) into the box cavity 48. Cable tie-off clips 36 are conveniently in axial alignment with the cable opening 62 to provide tie-off locations as low voltage cables (not shown) are fed into the box cavity 48. FIG. 6 depicts the box member 22 with the receptacle frame 24 secured therein and with a duplex receptacle 28 secured to the receptacle frame 24. As shown in FIG. 1, the duplex receptacle 28 is secured to the receptacle frame 24 by screws 64 and wire nuts 66.

Figure 12:
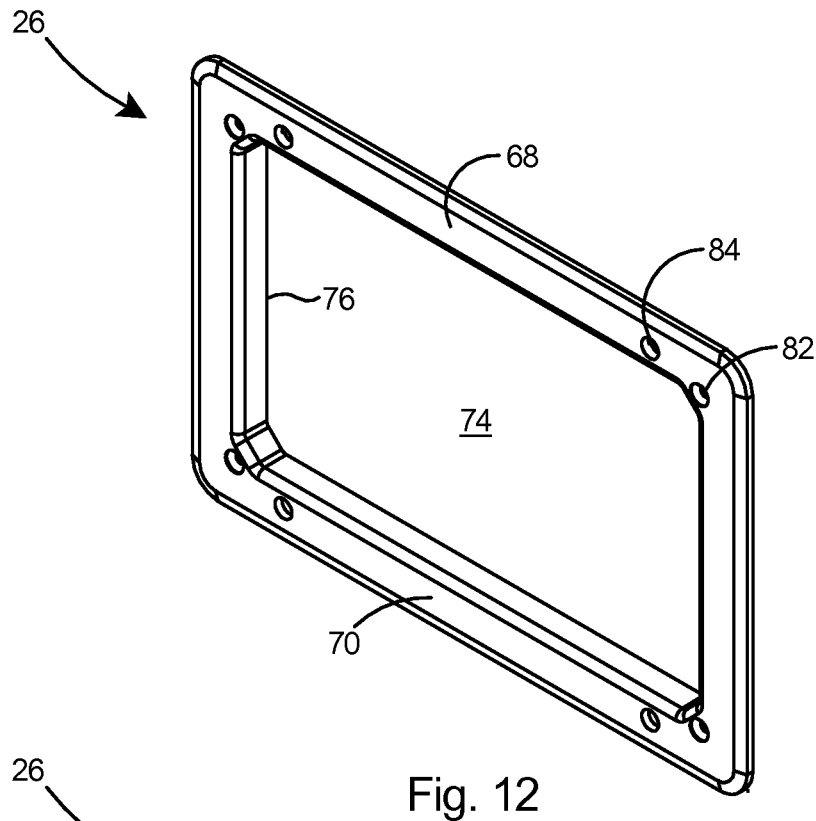
FIG. 12 is a front perspective view of the trim plate that forms a portion of the electrical device mounting assembly of FIG. 1.
Figure 13:
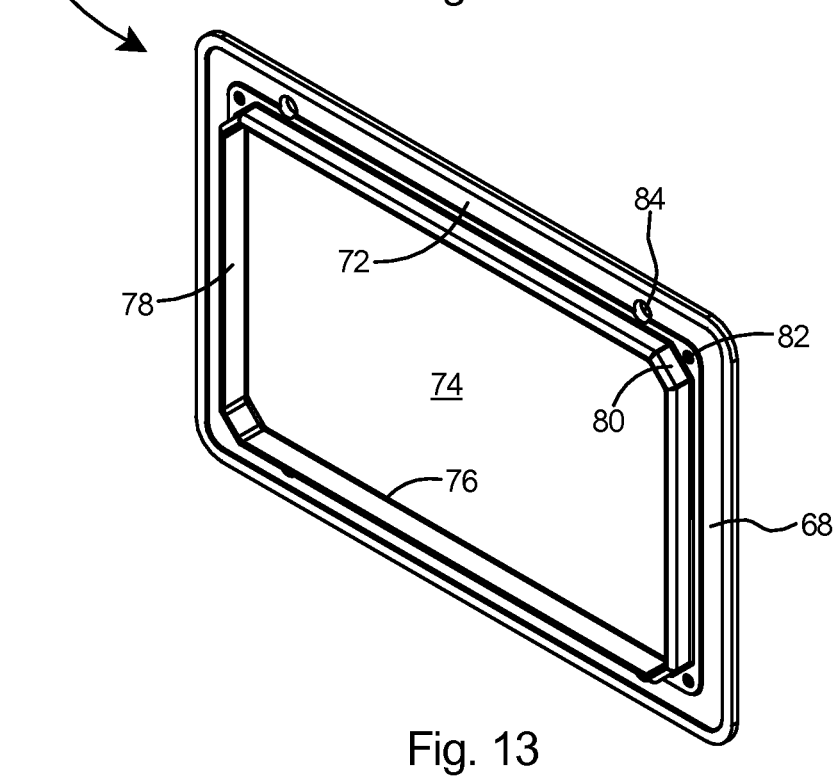
FIG. 13 is a rear perspective view of the trim plate.

With reference to FIGS. 12 and 13, the trim plate 26 includes a flange 68 having a front side 70 and a rear side 72 with an opening 74 defined by an inner periphery 76. A peripheral wall 78 extends from the rear side 72 of the flange 68 around the inner periphery 76. The peripheral wall 78 includes truncated corners 80. The flange 68 portion of the trim plate 26 includes inner apertures 82 and outer apertures 84. Peripheral wall 78 of trim plate 26 is sized such that the peripheral wall will nest within the sidewalls 32 of the box member 22 when the two are secured together (see FIG. 1).

Referring the FIG. 6, the peripheral wall 78 of the trim plate 26 is slightly smaller than the side walls 32 of the mounting frame 22 and thus will nest within the sidewalls 32 of the mounting frame 22. The significant advantage of the electrical box and frame assembly 20 of the present invention is that the entirety of the box member 22 will fit within the shallow wall cavity 86 of a wall 88 formed with furring strips (not shown). Typically the shallow wall cavity 86 has a depth, equal to dimension D1 on FIG. 6, of 1.25 inches. When electrical box and frame assembly 20 are fully installed, the rear side 72 of trim plate 26 is flush against the wall 88 and, with ½-inch thick wallboard, the outer wall 90 of the receptacle frame 24 extends outward of the wall surface only a slight distance of 0.585-inch, denoted by dimension D2 in FIG. 6, from the outer surface of the wall 88.

Figure 7:
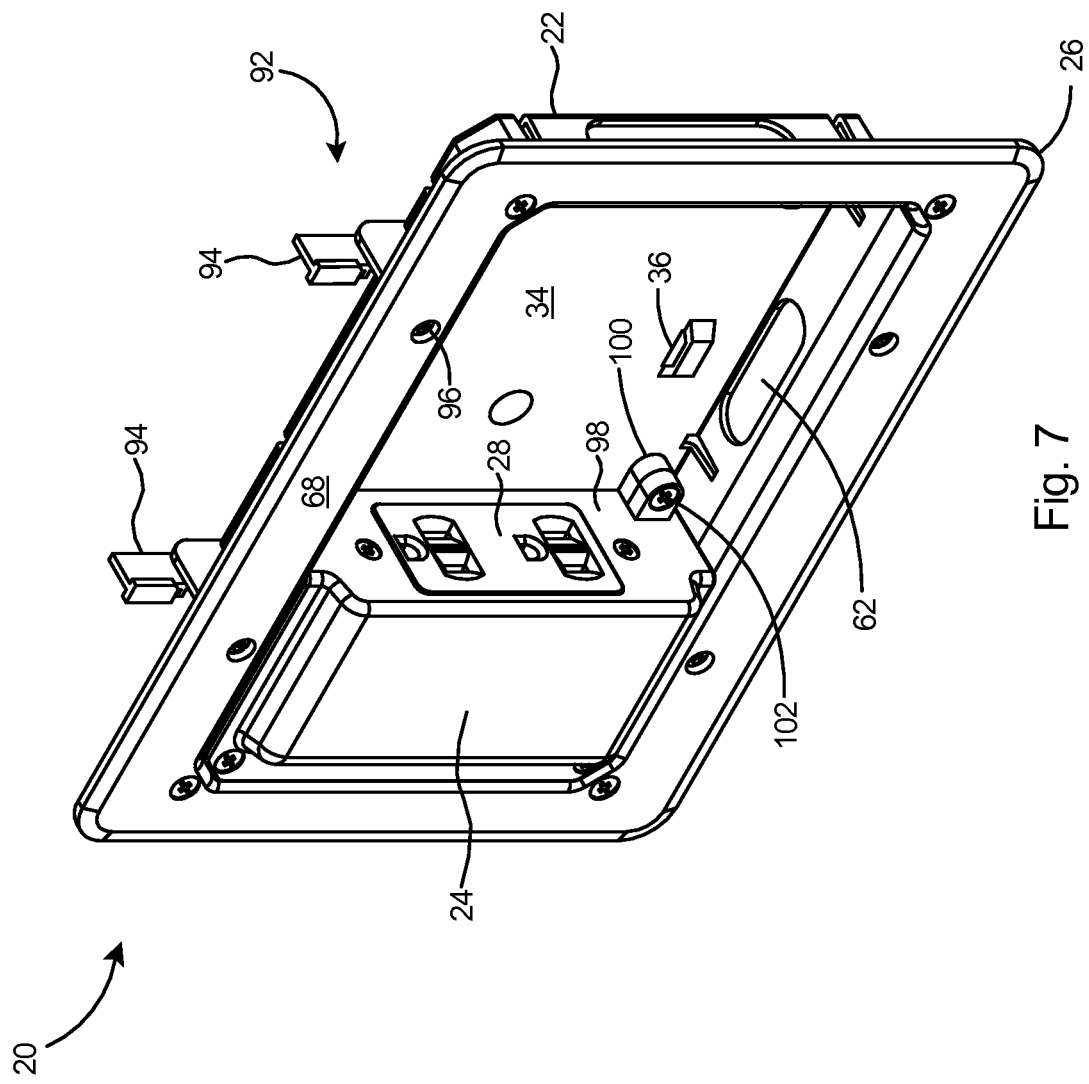
FIG. 7 is a perspective view of a fully assembled electrical box and frame assembly according to the present invention.

Referring to FIG. 7 there is shown a fully assembled electrical box and frame assembly 20 according to the present invention. The electrical box and frame assembly 20 includes a mounting arrangement 92 for securing the assembly to a wall (not shown). The mounting arrangement 92 includes rotatable flags 94 that are attached to the distal ends of the mounting fasteners 96 that are rotated clockwise to draw rotatable flags toward the trim plate 26 to thereby secure the electrical box and frame assembly 20 to the wall. Receptacle frame 24 includes a short sidewall 98 and lugs 100 extending outward from the short sidewall 98. The receptacle frame 24 is secured to the back wall 34 of the box member 22 by fasteners 102 driven through lugs 100.

Figure 14:
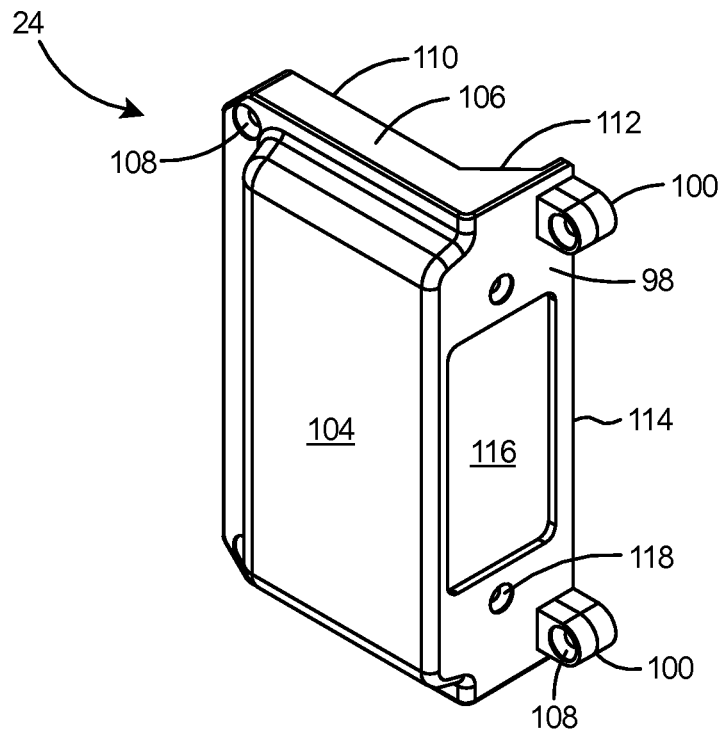
FIG. 14 is a perspective view of a receptacle frame that forms a portion of the electrical device mounting assembly of FIG. 1.
Figure 15:
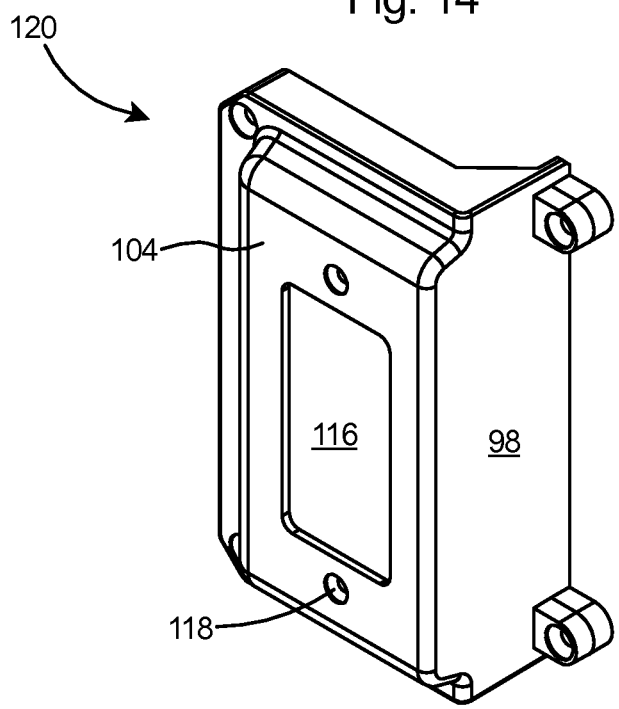
FIG. 15 is a perspective view of a second embodiment of the receptacle frame.

With reference to FIG. 14, the receptacle frame 24 further includes an outer wall 104, end walls 106, and bores 108 there through a portion of the outer wall 104 and through the lugs 100. End walls 106 include edges 110 and 112 and short sidewall 98 includes edge 114. The receptacle frame 24 will form an electrical box after it is secured to the box member 22 (see FIG. 1) as edges 110, 112, and 114 are secured against the back wall 34 of the box member 22. Receptacle frame 24 includes an opening 116 and apertures 118 in the short sidewall 114 to enable connection of a duplex receptacle 28 as shown in FIG. 1. As shown in FIG. 15, a second embodiment of the receptacle frame 120 includes the opening 116 and apertures 118 in the outer wall 104 rather than in the short sidewall as for the first embodiment of the receptacle frame 24.

Figure 8:
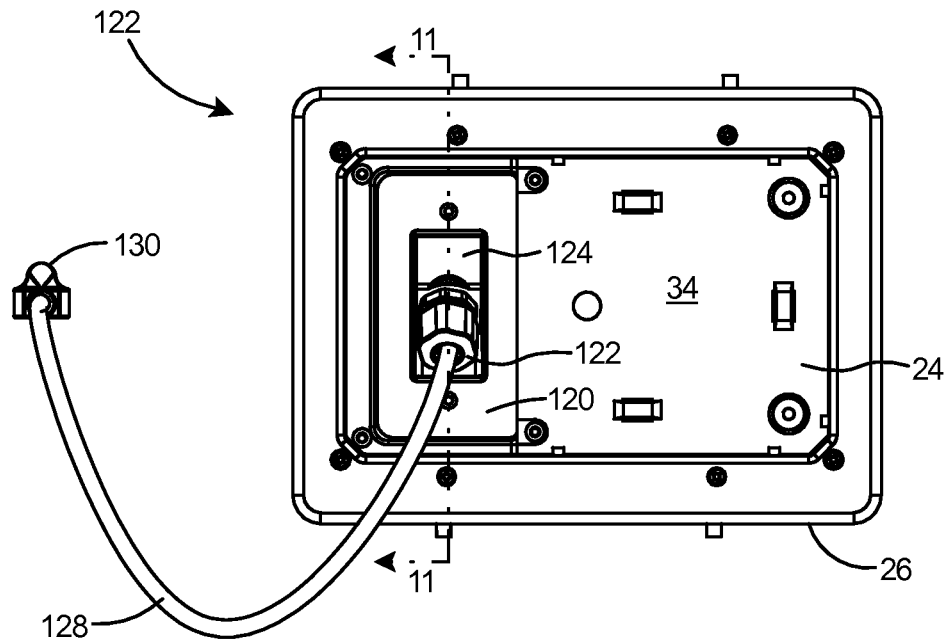
FIG. 8 is a front view of a second embodiment of the electrical box and frame assembly of the present invention.
Figure 9:
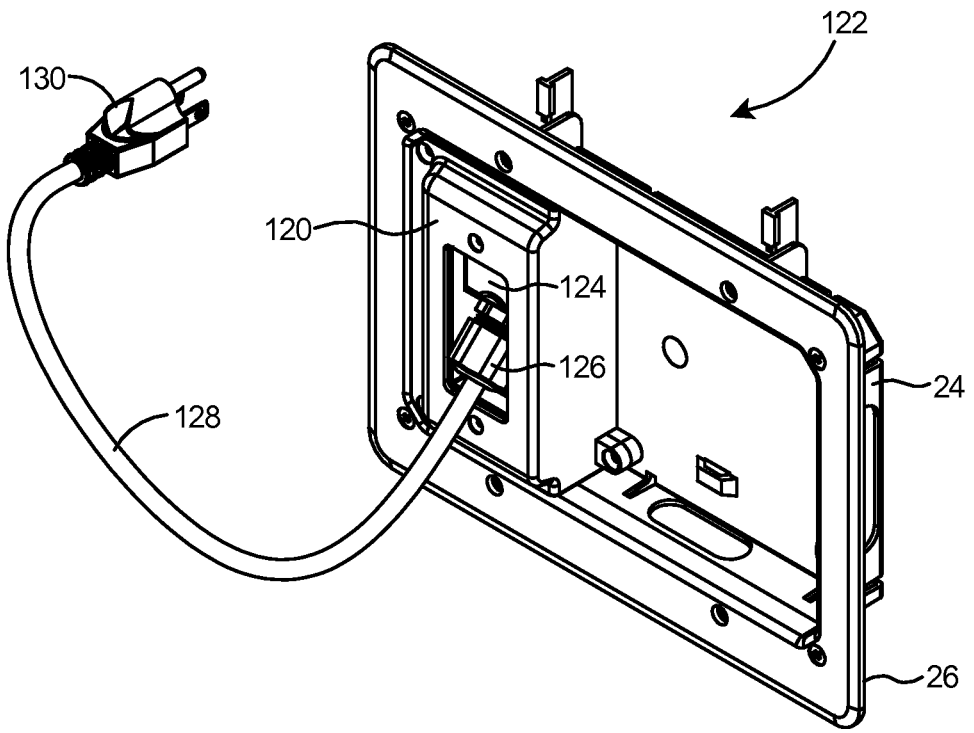
FIG. 9 is a perspective view of the electrical box and frame assembly of FIG. 8.
Figure 10:
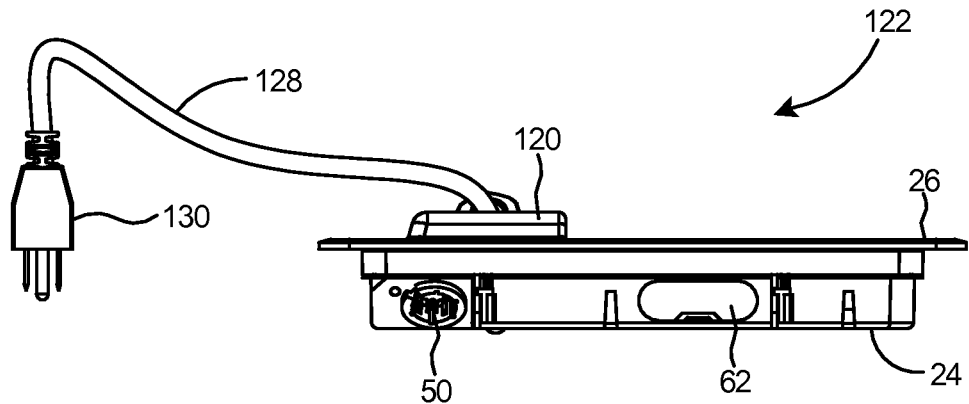
FIG. 10 is a side view of the electrical box and frame assembly of FIG. 8.

With reference to FIGS. 8 and 9, a second embodiment of the electrical box and frame assembly 122 includes the box member 22 and trim plate 26 of the first embodiment and the second embodiment of the receptacle frame 120. The receptacle frame 120 includes a cord grip mount 124 and a cord grip fitting 126. A preferred cord grip fitting 126 and cord grip mount 124 for connecting an electrical cord to an electrical box are respectively the LPCG50 cord grip and the CED50 mount, which are available from Arlington Industries of Scranton, Pa. The cord grip fitting 126 enables secure strain relief connection of a flexible cable 128 to the electrical box and frame assembly 122. When assembled as shown in FIGS. 8 and 9, the electrical box and frame assembly 122 can be used to supply electricity to a second electrical box (not shown) by plugging the plug end 130 of flexible cable 128 into an available existing electrical outlet and feeding power from receptacle frame 120 to the second electrical box.

Figure 11:
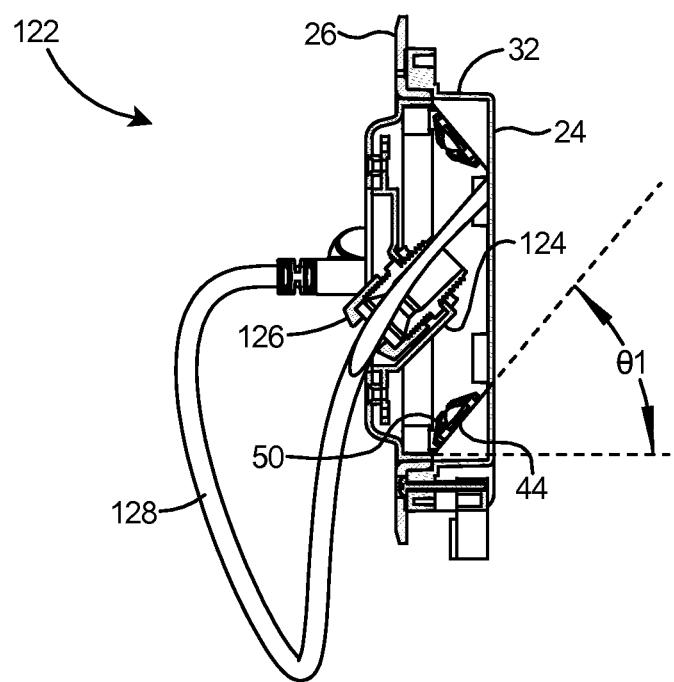
FIG. 11 is a sectional view of the electrical box and frame assembly taken along line 11-11 of FIG. 8.

As shown in FIG. 11, the cord grip fitting 126 secures flexible cable 128 to the electrical box and frame assembly 122. Slanted mounting surface 44 is at an angle with respect to the sidewalls 32 of the box member 22. Slanted mounting surface 44 is preferably at an angle of from 40 to 60 degrees, denoted by angle Θ1, with respect to the sidewalls 32 of the box member. Most preferably the slanted mounting surface 44 is at an angle of 50° with respect to the sidewalls 32 of the box member. This enables use of non-metallic electrical fitting 50 in the knockout of the slanted mounting surface 44.

Figure 16:
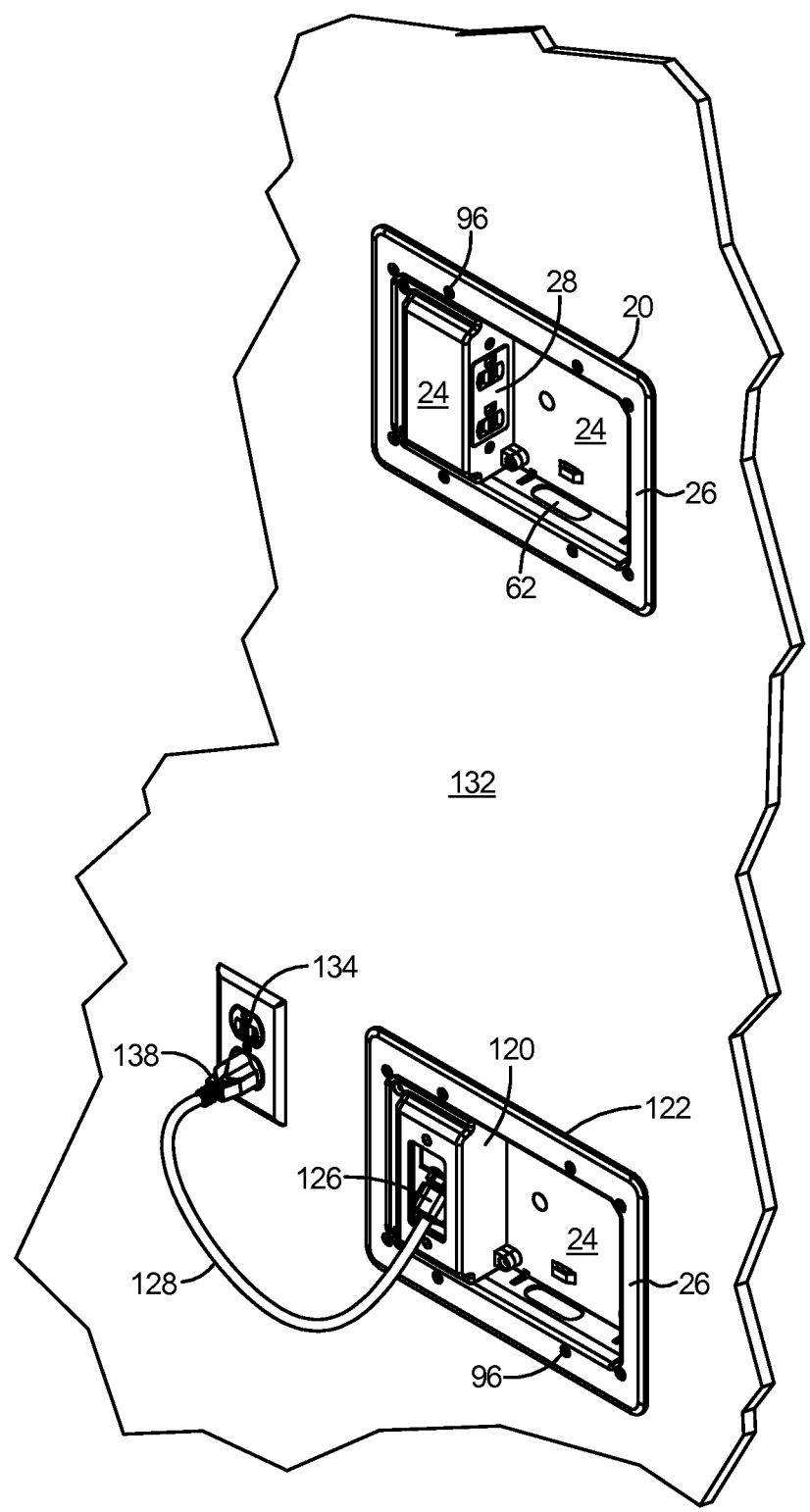
FIG. 16 is a conceptual drawing of an electrical installation utilizing the first and second embodiments the electrical box and frame assembly to reverse feed electrical power from one electrical box and frame assembly to a second electrical box and frame assembly.

With reference to FIG. 16, the electrical box and frame assemblies 20 and 122 of the present invention can be configured to reverse feed electrical power from one location to another. As an example, box and frame assembly 20 is mounted in the desired location high on a wall 132 which is remote from any existing electrical service. Prior to installing assembly 20, holes are made in the wall to accommodate the two box and frame assemblies 20 and 122. Wiring connections are made to electrical outlet 28 and a length of the connected electrical cable (not shown) is dropped behind the wall to the vicinity of box and frame assembly 122. To avoid tearing up the wall and routing electrical cable through the adjacent studs (not shown), box and frame assembly 122 is mounted at a lower location on the wall 132. The dropped cable from the top assembly 20 is then connected to the leads of flexible cable within receptacle frame 120. Receptacle frame 120 is secured to the box member 22, trim plate 26 is secured to the box member 22, and box and frame assembly 122 is secured to the wall 132 by tightening the mounting screws 96 which pull rotatable flags (not shown) against the rear wall surface. Electrical box and frame assembly 20 is secured to the wall in a similar manner. After both assemblies 20 and 122 are secured to the wall, flexible cable is simply plugged into the nearest existing electrical outlet 134. Power is then supplied through assembly 122 to the duplex receptacle 28 in box and frame assembly 20.

The box member 22, receptacle frame 24, and trim plate 46 portions of the box and frame assemblies 20 and 122 of the present invention may be constructed of metal or plastic. Most preferably, box member 22, receptacle frame 24, and trim plate 46 are each molded in one piece of plastic. Suitable plastics include polycarbonate and polyvinylchloride.

With reference to FIGS. 14 and 15, although the electrical box and frame assemblies herein are depicted with a first embodiment 24 and a second embodiment 120 of the receptacle frame, the first embodiment of the receptacle frame 24 is adapted to receive a cord grip mount 124 and cord grip fitting 126 into the opening 116 in the short sidewall 98 of the receptacle frame 24 in the same manner as the second embodiment 120 is adapted to receive it in the opening 116 in the outer wall 104.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An electrical assembly comprising:
   a box member including sidewalls and a back wall forming a cavity therein, said sidewalls including a front edge and said back wall including a rear surface;
   a receptacle frame for mounting within said cavity of said box member, said receptacle frame adapted for the mounting of an electrical component in a sideways orientation with respect to said box member;
   said cavity of said box member including a slanted mounting surface, said slanted mounting surface including a knockout for insertion of electrical cables into said cavity;
   said receptacle frame including an outer wall, end walls having edges, and a short sidewall having an edge, one of said edges is an angled edge;
   said edges and said outer wall of said receptacle frame mating with said back wall of said box member and said receptacle frame secured to box member to form an electrical box around said slanted mounting surface within said box member; and
   a trim plate to mount to said front edge of said box member.

2. The electrical assembly of claim 1 including
   a flange on said trim plate;
   a peripheral flange on said box member; and
   said box member including a depth measured from said front edge of said box member to said rear surface of said back wall of no more than 1.25 inches.

3. The electrical assembly of claim 2 including a mounting arrangement for securing said box member to a wall.

4. The electrical assembly of claim 3 wherein said mounting arrangement includes
   apertures in said flange of said trim plate;
   apertures in said peripheral flange of said box member;
   mounting fasteners including distal ends, said mounting fasteners extending through said apertures in said flange of said trim plate and through said apertures in said peripheral flange of said box member; and
   rotatable flags attached to said distal end of said mounting fasteners.

5. The electrical assembly of claim 1 including a cable connector in said knockout.

6. The electrical assembly of claim 1 wherein said slanted mounting surface is at an angle of from 40 to 60 degrees with respect to said sidewalls of said box member.

7. The electrical assembly of claim 6 including a lug extending outward from said short sidewall.

8. The electrical assembly of claim 7 wherein said receptacle frame includes a bore in said outer wall and said lug.

9. The electrical assembly of claim 1 wherein said receptacle frame includes an opening and apertures therein to enabling connection of an electrical component thereto.

10. The electrical assembly of claim 9 wherein said opening and said apertures in said receptacle frame are in said short sidewall.

11. The electrical assembly of claim 1 wherein said electrical component is a duplex receptacle.

12. The electrical assembly of claim 1 wherein said electrical component is a cord grip mount and a cord grip fitting.

13. The electrical assembly of claim 1 wherein said sidewalls of said box member include one or more cable openings therein.

14. The electrical assembly of claim 13 wherein said back wall of said box member includes a cable tie-off clip in axial alignment with said cable opening.

15. The electrical assembly of claim 1 including
   a fastening arrangement for securing said box member in new construction;
   said fastening arrangement including an aperture in said back wall; and
   a collar around each aperture.

16. The electrical assembly of claim 1 wherein
   said trim plate includes a flange having a rear side and a peripheral wall extending from said rear side of said flange; and
   said peripheral wall of said trim plate nests within said sidewalls of said box member when said trim plate and said box member are secured together.

17. The electrical assembly of claim 1 including
   a first electrical assembly and a second electrical assembly;
   said first electrical assembly including a cord grip mount, a cord grip fitting, and a flexible electrical cord secured to said first electrical assembly by said cord grip fitting; and
   said second electrical assembly including a duplex receptacle secured therein,
   whereby power is supplied from said first electrical assembly to said duplex receptacle of said second electrical assembly.

* * * * *